Nov. 1, 1955     M. LEICHSENRING     2,722,674
VEHICLE WARNING LIGHT CONTROL
Filed May 9, 1951
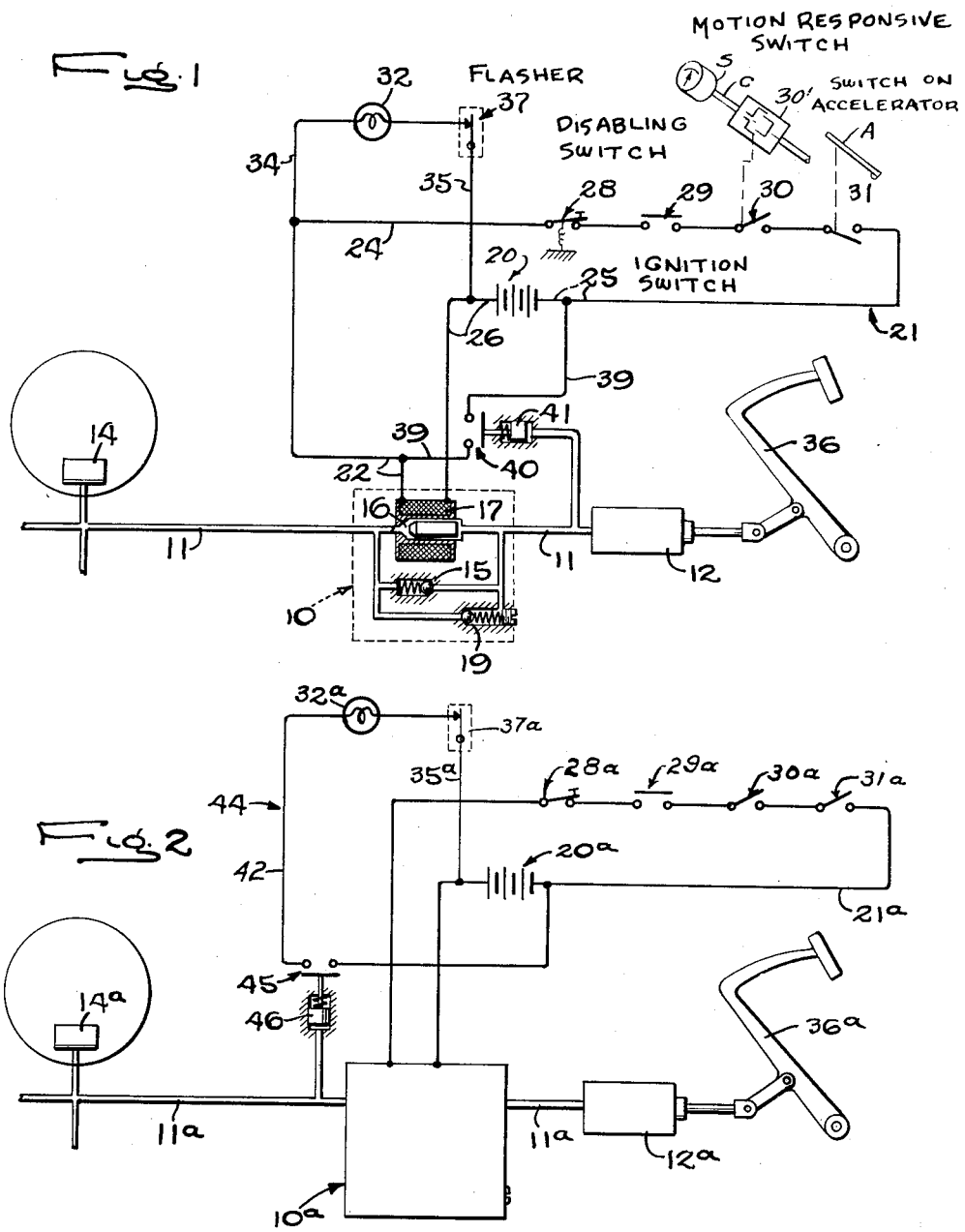

United States Patent Office 2,722,674
Patented Nov. 1, 1955

2,722,674

VEHICLE WARNING LIGHT CONTROL

Max Leichsenring, Chicago, Ill.

Application May 9, 1951, Serial No. 225,358

5 Claims. (Cl. 340—72)

The present invention relates to motor vehicle stop or warning light controls used in connection with hydraulic vehicle braking systems having brake holders interposed therein for maintaining the brakes in applied condition while the vehicles are standing.

The general object of the invention is to provide controls of the above character which are effective to automatically energize the warning light circuit of a vehicle when the latter is brought to a halt and to automatically maintain the circuit energized while the vehicle is standing without any further attention by the operator.

A more specific object is to provide a warning light control of the type set forth in which the light circuit for a vehicle is energized while the vehicle is standing by the power circuit for the brake holder.

Another specific object is to provide a novel arrangement of controls by which a vehicle warning light circuit is energized while the vehicle is standing through action of pressurized fluid trapped in portions of the vehicle brake system by the brake holder.

The objects of the invention thus generally set forth, together with other objects and ancillary advantages, are attained by the construction and arrangement shown by way of illustration in the accompanying drawing in which:

Figure 1 is a diagrammatic view illustrating a first embodiment of the invention.

Fig. 2 is a diagrammatic view illustrating a second embodiment of the invention.

A typical hydraulic vehicle braking system equipped with a holder for maintaining the brakes in applied condition after the vehicle is brought to a halt is illustrated in the drawing. As shown in Fig. 1, a brake holder 10 is interposed in a fluid line 11 interconnecting a pedal actuated master cylinder 12 with a plurality of brake wheel cylinders 14, only one of which is illustrated. The holder 10 is selectively operable to trap pressurized fluid in the wheel cylinders and portions of the line 11 on the wheel cylinder side of the holder when the vehicle is brought to a halt through application of the brakes.

As fully described in my copending application Serial No. 211,517, filed February 17, 1951, pressurized fluid from the master cylinder 12 may at any time flow into the brake cylinders 14 through a check valve 15 in the holder 10. While the vehicle is in motion the actuating fluid is freely returnable to the master cylinder through a valve 16. But when the vehicle is brought to a standstill the valve 16 is closed by a solenoid operator 17 which is automatically energized as an incident to stopping the vehicle. Preferably the pressure of the fluid trapped in the wheel cylinders 14 by the valve 16 is limited by an adjustable relief valve 19 built into the holder 10. The solenoid operator 17 is automatically deenergized to release fluid from the cylinders 14 as an incident to actuation of controls to start the vehicle in motion.

The electrical controls for the solenoid operator 17 are described in detail in my previously mentioned copending application and will be reviewed here only for purposes of showing their relationship to the warning light controls of the present invention. As shown, the operator 17 is selectively energized from a power source 20 through an electrical circuit, generally indicated at 21, having a number of switches interposed therein which are arranged to be variously operated to the end that the brake holder is effective only when the vehicle is in standing condition and is ineffective when the vehicle is in motion or is about to be placed in motion. For purposes of illustration, the circuit 21 includes a series of conductors 22, 24, 25 and 26, and a group of switches 28–31, inclusive, connected in series with each other and in series with the conductor 24.

The group of switches includes a normally closed disabling switch 28 which may be located on the vehicle dash or in any other conveniently accessible location and is manually operable to prevent operation of the holder whenever its action is not desired. Also, included is the vehicle ignition switch 29 which, of course, is opened when the engine is cut off. In this manner it is assured that the solenoid operator 17 does not remain energized to run down the vehicle's battery when the vehicle is not in use.

The switch 30 is of the type intended to be controlled by vehicle motion, that is to say, the switch 30 automatically closes when the vehicle is stopped and opens again once the vehicle starts to move. Switches of this general type are shown in my aforesaid copending application and also in U. S. Patent No. 2,313,430 issued March 9, 1943. As diagrammatically represented in Fig. 1 of the drawings, the switch 30 is arranged to be actuated by an operator 30' which is inserted in the drive cable C for the vehicle speedometer S. The operator 30' is so constructed and arranged that it automatically closes the switch 30 when the vehicle motion is stopped and opens the switch 30 when the vehicle starts to move.

The last of the switches illustrated is a circuit breaker 31 which is connected to one of the power controls of the vehicle such, for example, as the accelerator pedal A. The switch 31 is arranged to interrupt the solenoid circuit when the accelerator pedal is pressed downwardly in the course of setting the vehicle in motion. Control switches per se operable in response to vehicle motion are generally old as evinced by U. S. Patent No. 2,313,430, issued March 9, 1943.

In accordance with one aspect of the present invention the stop or warning light 32, normally disposed on the rear of the vehicle, is interconnected with the brake holder control circuit 21 in such a manner that this circuit serves to energize the light as well as the solenoid operator 17 when the vehicle is standing. As shown, the interconnection is made by electrical leads 34 and 35 extending between opposite terminals of the light 32 and the conductors 24 and 26 respectively.

Tracing out the circuits thus formed, it will be seen that the switches 28 to 31 when closed complete an electrical circuit through conductors 25, 24, 34, 35 and 26 from the power source 20 to the light 32.

By virtue of this integration of the warning light circuit with the brake holder control circuit, the warning light is automatically kept burning to protect the vehicle from approaching traffic when it is halted. This protection is afforded without any necessity on the part of the operator to maintain continued pressure on the brake control pedal 36 associated with the master cylinder 12.

In order to make the warning light 32 more conspicuous, it is preferred that a flasher 37 be interposed in the light circuit to cause the light to give a blinking rather than a steady signal.

Since the circuit through the switches 28 to 31 is not fully closed until the vehicle is brought to a halt, additional means is provided for cyclically energizing the warning light when the brakes are applied but while the vehicle is still moving. For this purpose a lead 39 is interconnected between one terminal of the power source 20 and a normally unenergized terminal of the light 32, which connection is made through conductors 22 and 34. A switch 40 is interposed in the lead 39 to selectively by-pass current around the switches 28 to 31 to energize light 32 when the pressure in line 11 is increased as an incident to application of the brakes. As shown, this switch is actuated by a fluid operator 41 interconnected with the line 11 on the master cylinder side of the holder 10.

In the second embodiment of the invention shown in Fig. 2, structural elements similar to those appearing in the first embodiment of Fig. 1 are identified by the same reference numerals with the addition of the suffix *a*. In this embodiment the stop or warning light 32*a* is interconnected with the power source 20 through electrical leads 35*a* and 42 to form a light circuit 44. Preferably, a flasher 37*a* is included in the circuit 44. Selective energization of the circuit 44 is effected through a switch 45 operated by a fluid actuator 46. In order to cause the switch 45 to be closed when the brakes are applied and automatically remain closed as long as the brakes are held in applied condition by the holder 10, the actuator 46 is interconnected with the line 11 on the wheel cylinder side of the holder 10. Since pressurized fluid is maintained in this portion of the line 11 while the vehicle is halted, the warning light circuit will automatically be energized without any attention from the operator even though foot pressure may be removed from the brake pedal 36*a*.

I claim as my invention:

1. For use with a motor vehicle having an electrical system including a main switch and a hydraulic brake system including master and wheel cylinders with a fluid line interconnected therebetween, a combined brake system and warning light control comprising, in combination, a brake holder interposed in small fluid line, an electrical control circuit for said holder independent of the hydraulic brake system, said circuit including a motion responsive switch operative to disable the circuit so long as the vehicle is in motion and including the main switch for the electrical system of the vehicle, a warning light, and an electrical control circuit for said warning light including a switch responsive to pressurization of said line, said light control circuit being connected in electrically parallel relation with said holder control circuit so that said warning light circuit is energized whenever said line is pressurized, and both the holder control circuit and the light control circuit are energized through the motion responsive switch when the vehicle is at rest.

2. For use with a motor vehicle having an electrical system including a main switch and a hydraulic brake system including master and wheel cylinders with a fluid line interconnected therebetween, a combined brake system and warning light control comprising, in combination, a brake holder interposed in said fluid line, an electrical control circuit for the brake holder independent of the hydraulic brake system and including the main switch for the electrical system of the vehicle, a warning light, an electrical control circuit for said warning light connected in electrically parallel relation with said holder control circuit, a flasher interposed in said circuit to permit an intermittent flow of current to said light, a switch in said light control circuit responsive to pressurization of said line and operative to energize said circuit whenever said line is in a pressurized brake-applying condition, and a switch in said holder control circuit responsive to motion of the vehicle and operative to energize both the holder control circuit and the light control circuit when the vehicle is at rest.

3. For use with a motor vehicle having an electrical system including a main switch and a hydraulic brake system including master and wheel cylinders with a fluid line interconnected therebetween, a combined brake system and warning light control comprising, in combination, a brake holder interposed in said fluid line, an electrical control circuit for the brake holder independent of the hydraulic brake system and including the main switch for the electrical system of the vehicle, a warning light, an electrical control circuit for said warning light connected in electrically parallel relation with said holder control circuit, a flasher interposed in said circuit to permit an intermittent flow of current to said light, a switch in said holder control circuit responsive to motion of the vehicle for energizing the holder control circuit and the light control circuit when the vehicle is at rest, a by-pass circuit around said holder control circuit and connected with said light control circuit for operating same when the vehicle is in motion, and a fluid pressure operated switch interposed in said by-pass circuit and interconnected with said fluid line to selectively energize said warning light as an incident to an increase in fluid pressure in said line.

4. For use with a motor vehicle having an electrical system including a main switch and a hydraulic brake system including master and wheel cylinders with a fluid line interconnected therebetween, a combined brake system and warning light control comprising, in combination, a brake holder interposed in said fluid line for selectively trapping fluid in said line on the wheel cylinder side of said holder, an electrical control circuit for the brake holder independent of the hydraulic brake system and including the main switch for the electrical system of the vehicle, a switch in said circuit responsive to motion of the vehicle and operative to disable said circuit so long as the vehicle is in motion, a warning light, an electrical control circuit for said warning light connected in electrically parallel relation with said holder control circuit, a flasher interposed in said circuit to permit an intermittent flow of current to said warning light, a switch interposed in said light control circuit for selectively opening and closing the circuit, a fluid pressure operator for said switch, said operator being interconnected with said fluid line on the wheel cylinder side of said holder to close said switch in response to an increase in pressure in said line and to maintain said switch closed as long as pressurized fluid is trapped in the contiguous portion of the line by said holder.

5. For use with a motor vehicle having an electrical system including a main switch and a hydraulic brake system including master and wheel cylinders with a fluid line interconnected therebetween, a combined brake system and warning light control comprising, in combination, a brake holder interposed in said fluid line, an electrical control circuit for said holder independent of the hydraulic brake system, said circuit including the main switch for the electrical system of the vehicle, a warning light, an electrical control circuit for said warning light, a fluid pressure operated switch in said light control circuit responsive to pressurization of said line for energizing said light, and a switch responsive to vehicle motion in said holder control circuit for energizing said holder when the vehicle is at rest independent of said fluid pressure operated switch, said light control circuit being connected in electrically parallel relation with said holder control circuit so that said light is energized when the vehicle is at rest independent of said fluid pressure operated switch.

References Cited in the file of this patent

UNITED STATES PATENTS

| | | |
|---|---|---|
| 1,296,276 | Fischer | Mar. 1, 1919 |
| 1,663,691 | Everett | Mar. 27, 1928 |
| 1,785,366 | Schoenberg | Dec. 16, 1930 |
| 1,946,759 | Preston et al. | Feb. 13, 1934 |
| 1,951,882 | Pentecost | Mar. 20, 1934 |
| 2,134,902 | White | Nov. 1, 1938 |
| 2,183,444 | Collins | Dec. 12, 1939 |
| 2,414,409 | Geepfrich | Jan. 14, 1947 |